(12) United States Patent
Swinton et al.

(10) Patent No.: US 7,827,233 B1
(45) Date of Patent: Nov. 2, 2010

(54) METHOD AND APPARATUS FOR AN END-TO-END SEND-TO FRAMEWORK

(75) Inventors: William Swinton, Santa Cruz, CA (US); Brian Bodmer, Santa Cruz, CA (US); Eric Bodnar, Santa Cruz, CA (US); Jonah Kaj Fleming, Santa Cruz, CA (US)

(73) Assignee: Syniverse ICX Corporation, Tampa, FL (US)

( * ) Notice: Subject to any disclaimer, the term of this patent is extended or adjusted under 35 U.S.C. 154(b) by 1162 days.

(21) Appl. No.: 10/893,470

(22) Filed: Jul. 16, 2004

(51) Int. Cl.
*G06F 15/16* (2006.01)
*G06F 15/173* (2006.01)

(52) U.S. Cl. .................. 709/203; 709/204; 709/224; 709/227

(58) Field of Classification Search .......... 709/203, 709/204, 206, 207, 224, 227, 228
See application file for complete search history.

(56) References Cited

U.S. PATENT DOCUMENTS

| | | | | |
|---|---|---|---|---|
| 5,758,088 A * | 5/1998 | Bezaire et al. | ........ | 709/232 |
| 6,611,814 B1 * | 8/2003 | Lee et al. | ........ | 705/26 |
| 6,771,801 B1 * | 8/2004 | Fisher et al. | ........ | 382/112 |
| 6,848,000 B1 * | 1/2005 | Reynolds | ........ | 709/226 |
| 6,920,487 B2 | 7/2005 | Sofer et al. | | |
| 7,111,044 B2 | 9/2006 | Lee | | |
| 7,206,647 B2 * | 4/2007 | Kumar | ........ | 700/83 |
| 7,302,402 B2 * | 11/2007 | Callaghan et al. | ........ | 705/26 |
| 7,302,480 B2 * | 11/2007 | Lahtinen | ........ | 709/224 |
| 7,421,730 B2 * | 9/2008 | Walther et al. | ........ | 726/2 |
| 7,460,873 B2 | 12/2008 | Lovell et al. | | |
| 2002/0052921 A1 * | 5/2002 | Morkel | ........ | 709/206 |
| 2002/0091843 A1 * | 7/2002 | Vaid | ........ | 709/230 |
| 2002/0133545 A1 * | 9/2002 | Fano et al. | ........ | 709/203 |
| 2003/0018726 A1 * | 1/2003 | Low et al. | ........ | 709/206 |
| 2003/0065738 A1 * | 4/2003 | Yang et al. | ........ | 709/215 |
| 2004/0043770 A1 * | 3/2004 | Amit et al. | ........ | 455/450 |
| 2004/0186889 A1 | 9/2004 | Washburn | | |
| 2005/0071419 A1 * | 3/2005 | Lewontin | ........ | 709/201 |
| 2008/0039048 A1 | 2/2008 | Turri et al. | | |
| 2008/0304506 A1 | 12/2008 | Becker et al. | | |

FOREIGN PATENT DOCUMENTS

WO    WO 2004/105405 A2    12/2004

OTHER PUBLICATIONS

PCT/US07/22437, International Search Report and Written Opinion, dated Mar. 14, 2008, 8 pages.

* cited by examiner

*Primary Examiner* — Asad M Nawaz
*Assistant Examiner* — Farzana Huq
(74) *Attorney, Agent, or Firm* — Blakely, Sokoloff, Taylor & Zafman, LLP; Judith A. Szepesi (57) ABSTRACT

A method and apparatus for providing a send-to framework is described. The method enables a round-trip mechanism between a stateless device and a third party service provider. In one embodiment, the method includes interposing a central server between the stateless device and the third party service provider, which maintains a state for the stateless device, and in one embodiment communicates the state to the third party service provide and/or the stateless device.

16 Claims, 11 Drawing Sheets

METHOD AND APPARATUS FOR AN END-TO-END SEND-TO FRAMEWORK

FIELD OF THE INVENTION

The present invention relates to cellular telephone networks, and more particularly to enabling communications with a third party provider.

BACKGROUND

Cellular networks are attempting to offer more and more services provided by third party providers, such as games, ordering photographic prints, and other services. However, most handsets are stateless, that is, they are not able to establish a connection with a third party, but rather send atomic packets. This makes transactions that cannot be performed by sending and receiving a single set of packets difficult.

SUMMARY OF THE INVENTION

A method and apparatus for providing a send-to framework to enable a round-trip mechanism between a stateless device and a third party service provider, by maintaining a state for the stateless device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for an end-to-end send-to framework that enables a round-trip mechanism between a stateless device, such as a cellular telephone, and a third party service provider. A central server may be disposed between the stateless device and the service provider. In one embodiment, the stateless device receives an address book from the central server, the address book including third party service provider contact information. In one embodiment, the contact information does not identify a particular third party provider, but rather identifies the service. The user of the stateless device or the third party service provider may initiate the round-trip mechanism.

Figure 1:
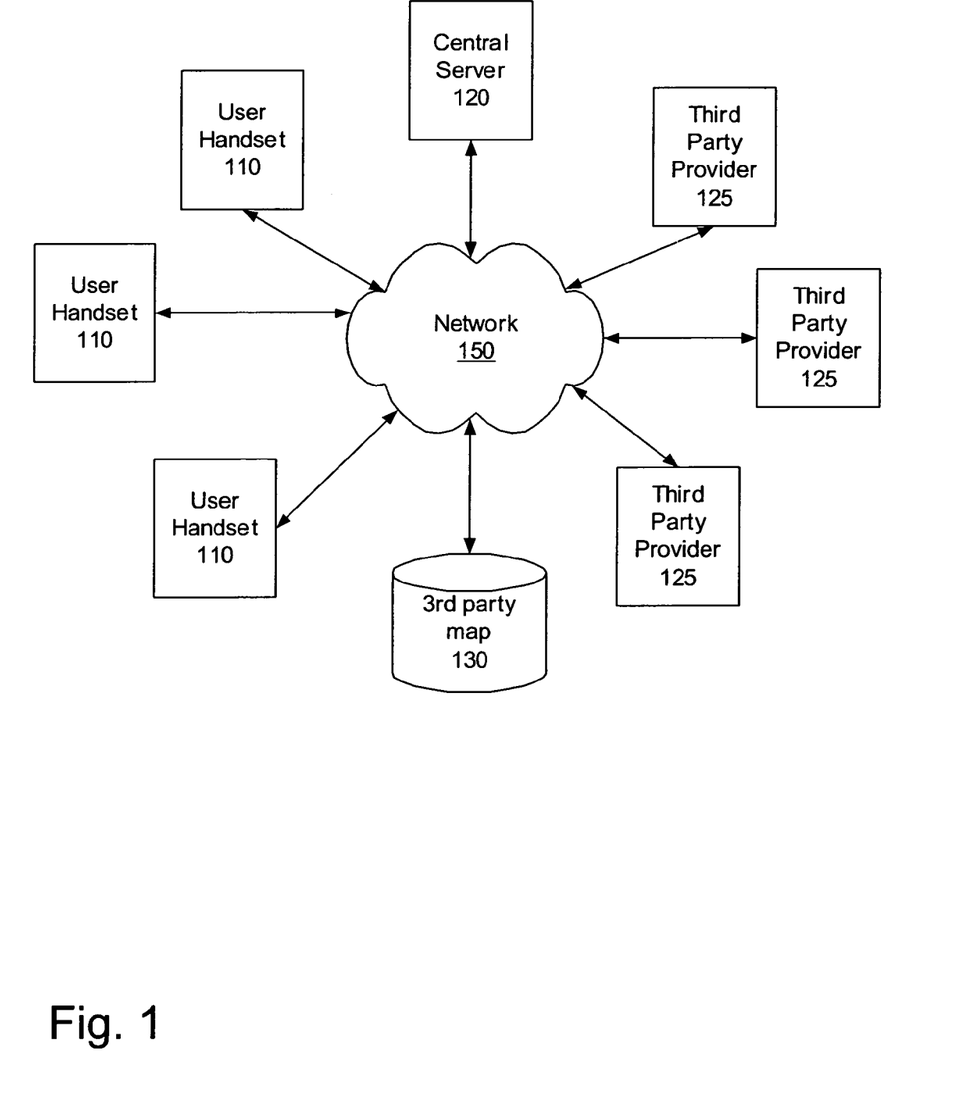
FIG. 1 is a network diagram of one embodiment of a network in which the present invention may be implemented.

FIG. 1 is a network diagram of one embodiment of a network in which the present invention may be implemented. The stateless device 110, in one embodiment a user's cellular telephone handset, is coupled to a central server 120 through a network 150. In one embodiment, the network 150 may be a cellular network. Central server 120 has access to a 3rd party mapping 130. In one embodiment, 3rd party mapping 130 is a database accessible to the central server 120 either directly or through network 150.

The central server 120 can access third party providers 125 through the network 150. The network 150 may be the Internet, LAN, WAN, or other network. In one embodiment, stateless device 110 and third party provider 125 can establish a direct connection, without central server 120. In one embodiment, the central server 120 remains in the transaction. Note that the cellular telephone service provider is not shown in this illustration. Cellular telephone handsets 110 generally can only be accessed through cellular telephone service provider. However, cellular telephone service provider simply forwards messages, and therefore has been left out of this figure for simplicity. In one embodiment, the central server 120 is part of the cellular telephone service provider, however.

Figure 2:
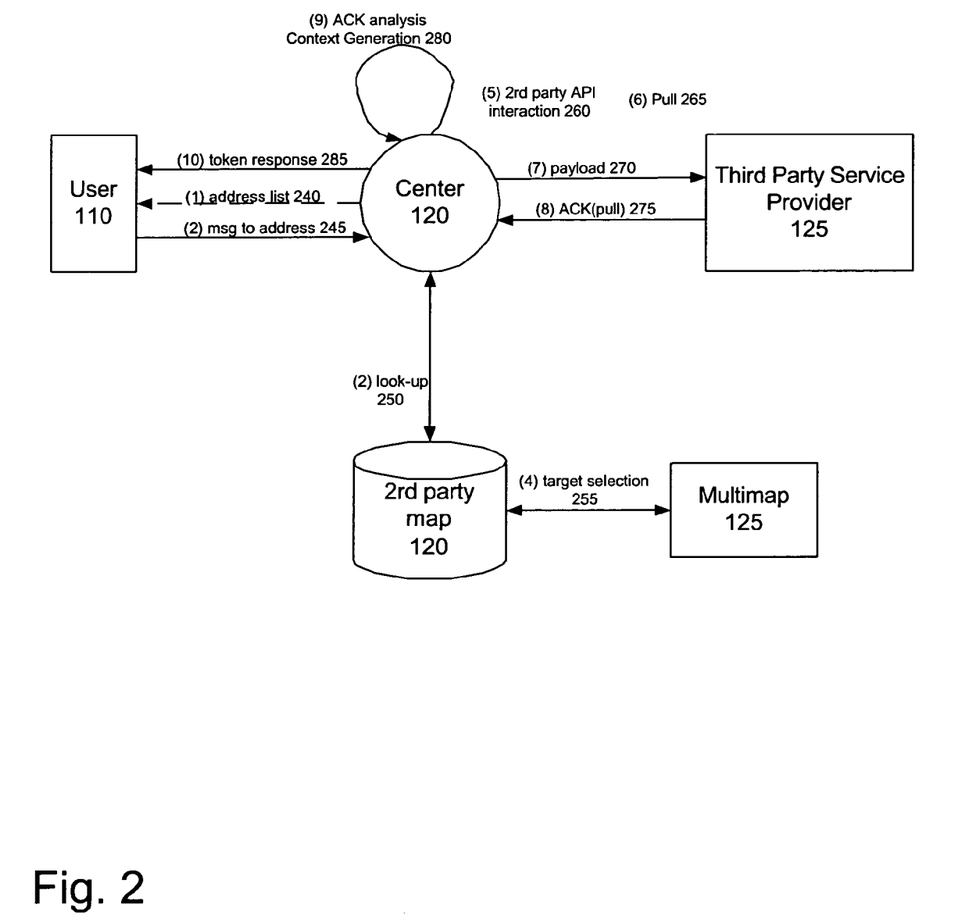
FIG. 2 is a block diagram of one embodiment of message exchanges.

FIG. 2 is a block diagram of one embodiment of message exchanges. The user 110 is using a stateless device, such as a cellular telephone. The central server 120 provides access to services by the, and to the, user 110. The central server 120 sends a customized address list 240 to the user. The customized address list 240 provides a list of services available to the user. In one embodiment, the actual third party service provider 125 that provides each service is not specified. For example, the address list may look as follows:

1. Order photo prints
2. Send photos to web page
3. Blog
4. Vote in current poll The user may select a service, and send a message to initiate the service 245. As will be described below, when the user selects a service, a composer is enabled, which requests the appropriate information from the user. The central server 120 receives the message 245, and performs a look-up in the 3rd party map 120.

In one embodiment, if there are multiple service providers which are available, the process performs target selection 255 using multimap 225. Multimap 225 permits the system to choose a third party service provider 125 to service the user's request. In one embodiment, multimap 225 chooses among the third party service providers 125 using one or more of the following methods: random selection, optimization of user service, current location of user, payment by third party provider, or other differentiators.

Once the third party provider is selected, by multimap 225 or 3rd party map 120, the center uses a 3rd party interface to interact with the third party service provider 125. IN one embodiment, the interaction results in a data pull 265, sent by the third party provider, to request additional data. The payload 270 includes the data from the original message, in one embodiment. The third party provider sends an acknowledgement 275, if the payload is successfully received. In one embodiment, the central server 120 resends the payload, if the acknowledgement is not received.

The central server 120 performs an acknowledgement analysis, and generates context for the stateless device 110. Since the stateless device does not track unfulfilled requests, the central server 120 effectively acts as a "state holder" by generating a context, and adding context information to the data received from the third party service provider 125.

The token response 285, including the context data generated by the central server 120 is then returned to the stateless device 110. This may initiate another message 245. In one embodiment, the token response 285 may initiate a direct connection between the third party service provider 125 and the stateless device 110, for example by providing a universal resource indicator (URI) from which data should be obtained, or to which data should be sent.

Figure 4A:
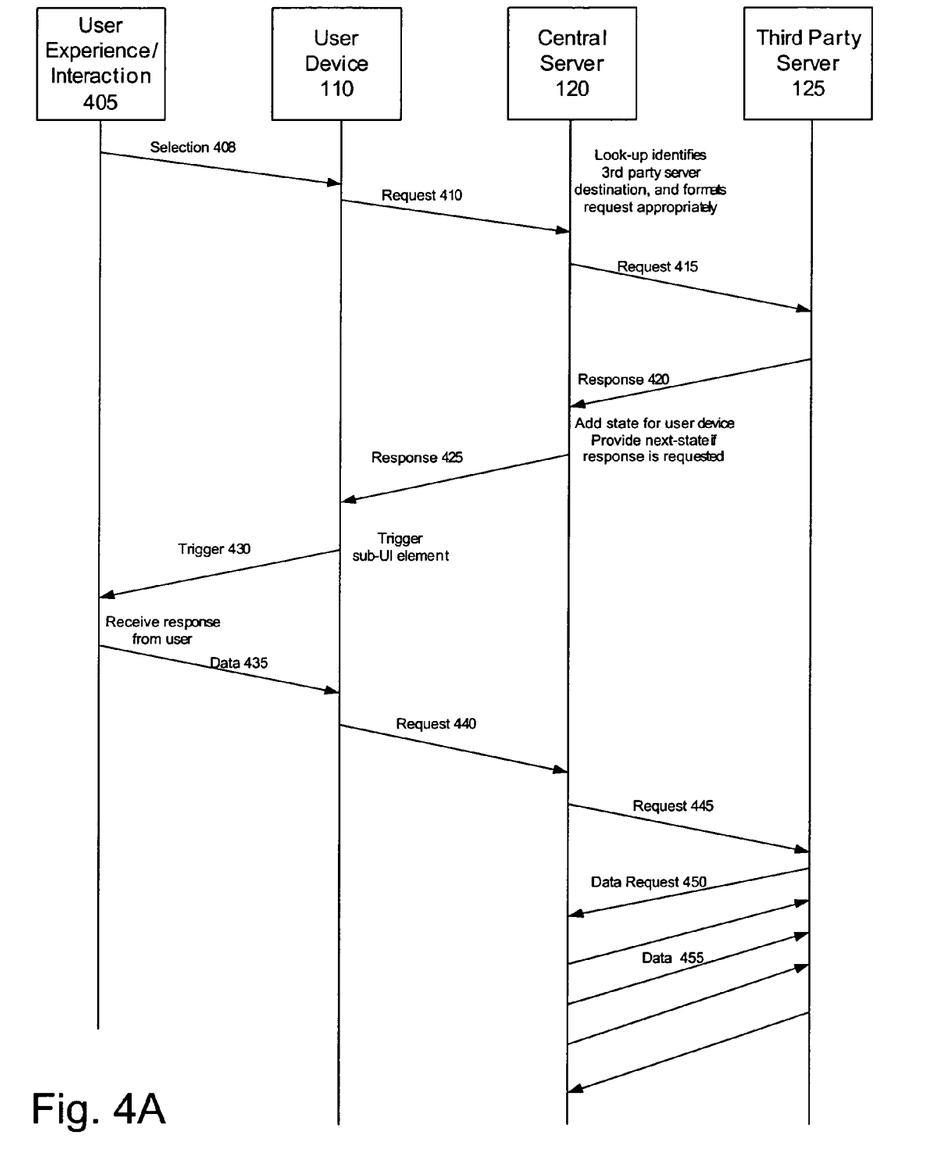
FIGS. 4A-4C are embodiments of data flow diagrams illustrating exemplary data flow in the present system.
Figure 4B:
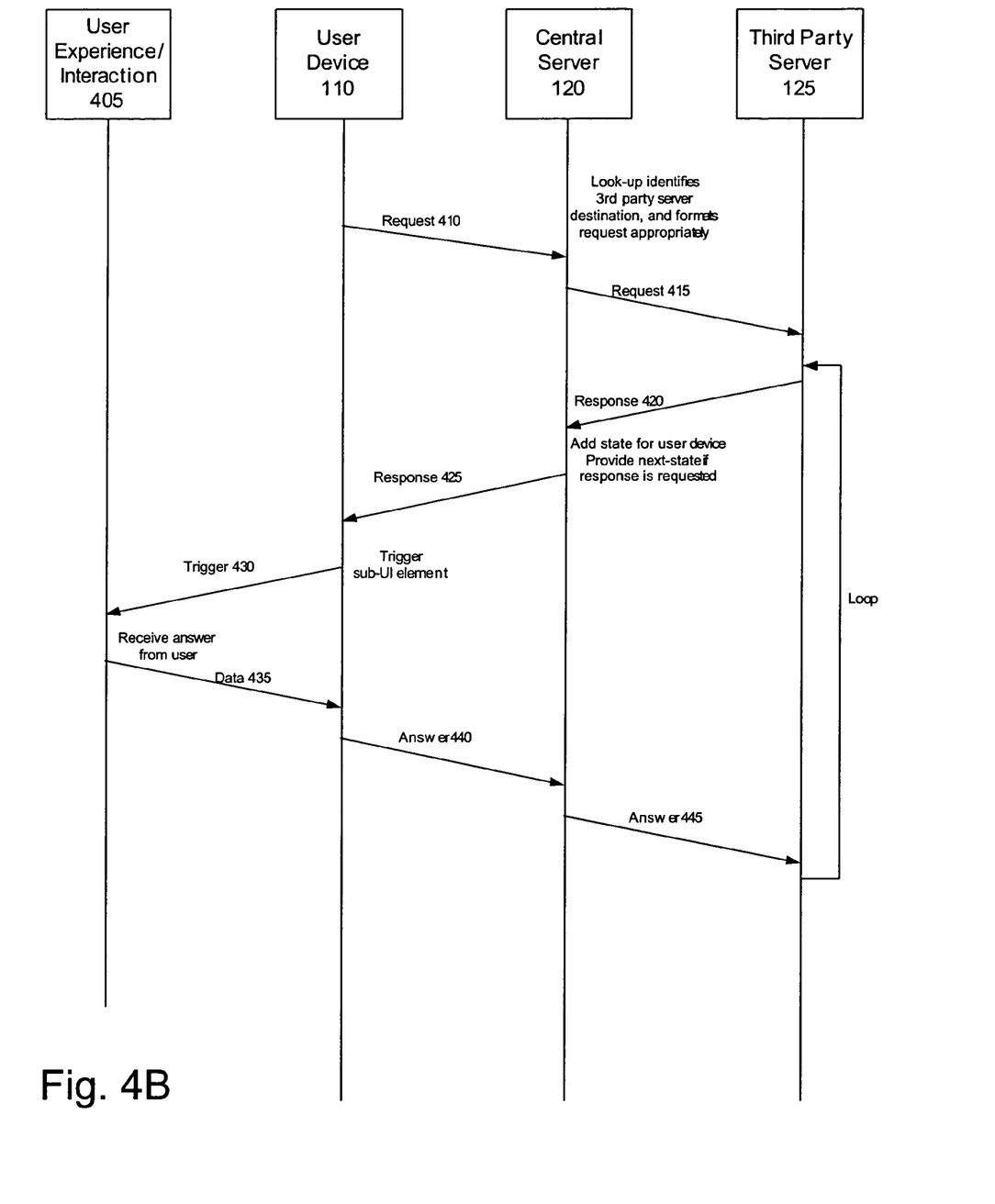
Figure 4C:
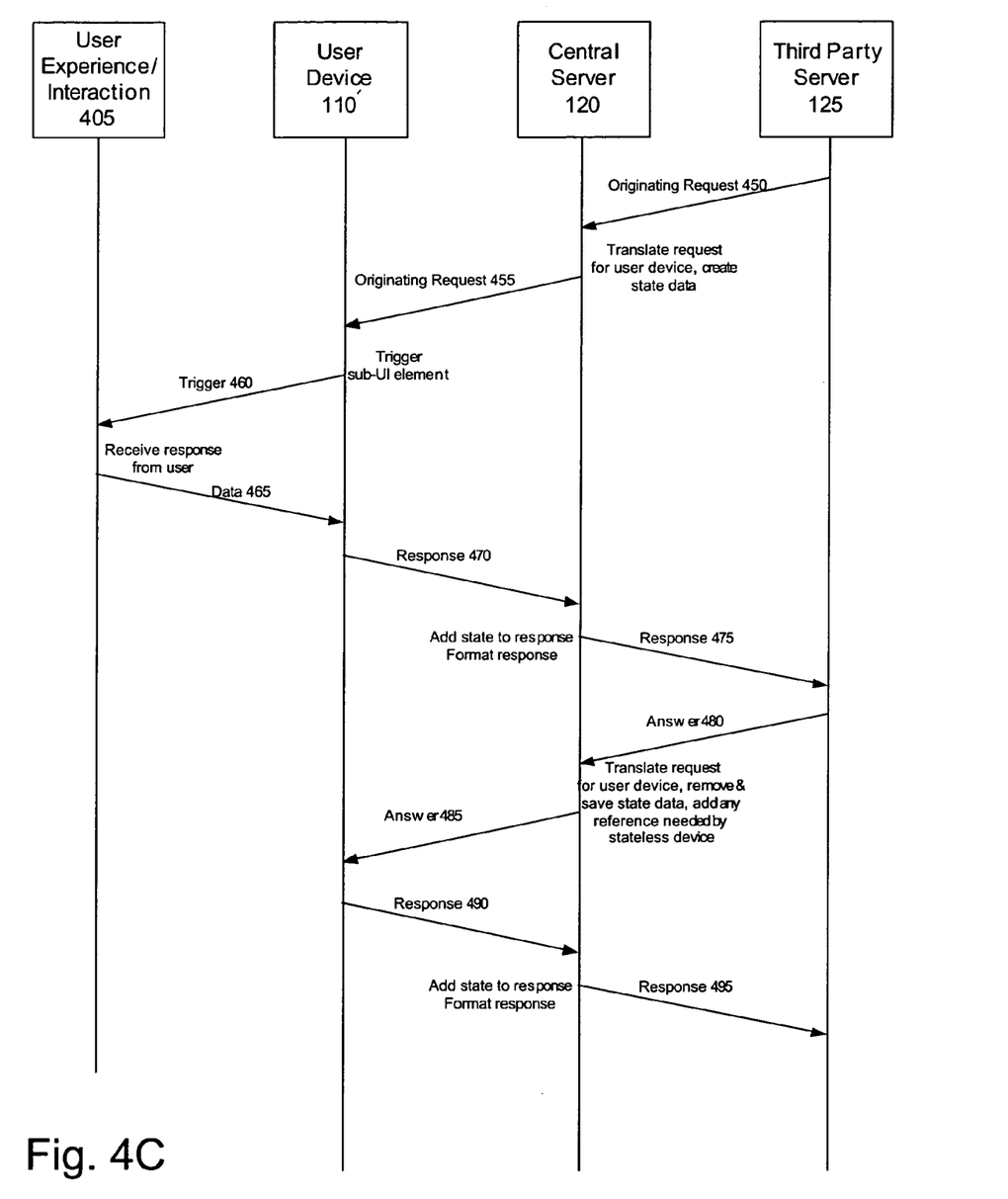

By providing context to the stateless device 110, the system enables a round-trip mechanism in which a single transaction can include multiple data exchanges between the stateless device 110 and the third party service provider 125. The central server 120 may server as an intermediary in setting up this round-trip mechanism. FIGS. 4A-C illustrate in more detail some of the data exchange possibilities.

Figure 3:
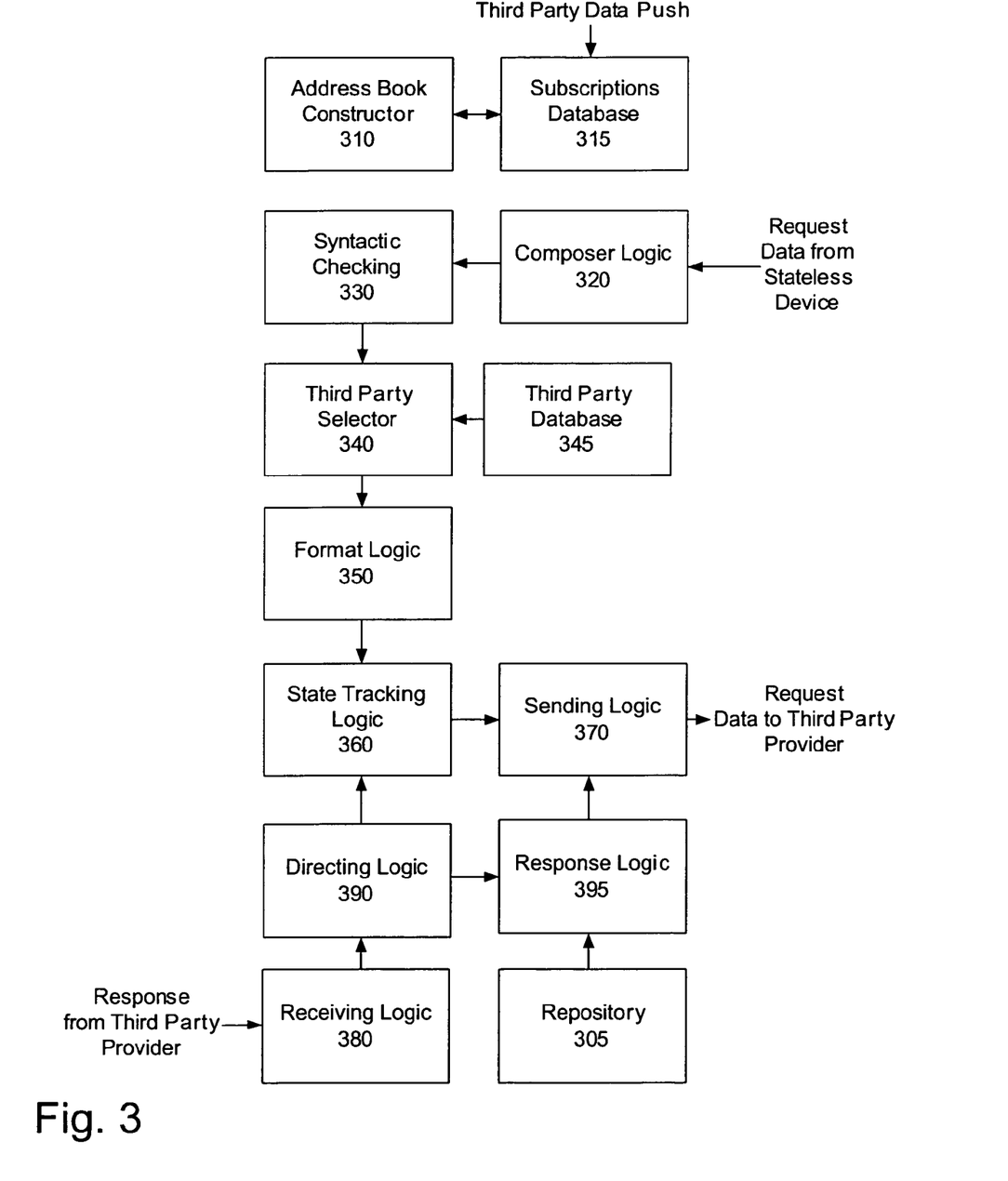
FIG. 3 is a block diagram of one embodiment of the central server.

FIG. 3 is a block diagram of one embodiment of the send-to logic 300. In one embodiment, the send-to logic 300 resides on the central server. In another embodiment, the send-to logic 300 is split between the central server and the stateless device(s) which interact with the central server.

The send-to logic 300 includes an address book logic 310, to generate a personalized address book for a stateless device. In one embodiment, each stateless device has an entry in the database of subscriptions 315, which track the third party services to which the user of the stateless device has access. In one embodiment, the address book logic 310 can receive data from a third party provider. For example, the third party provider may be a site that has polls. The third party provider can update the send-to logic 300 with the current poll data.

In one embodiment, the actual appearance of the address book entry does not change. For example, for a third party provider that enables voting in the American Idol Television show, the address book entry may read "Vote for American Idol," while the third party provide may push the current options to the send-to logic 300, for the composer logic 320, as will be described below. In another embodiment, the appearance of the address book entry may change, i.e. it may read Vote for A or B.

If the user selects an address book entry on the stateless device, the composer logic 320 presents an interface for the user to enter the data for the request. The composer presents the data for the proper information to be submitted to the third party. For example, if the user selects "post pictures to photo album" the composer presents an interface which permits the user to add photographs, add appropriate labels, and select the proper location within the photo album.

Once the user has entered data into the composer presented by the composer logic 320 syntactic checker 330 determines whether the data provided by the user includes the proper information. If the syntactic checker 330 determines that additional data is required from the user, the composer 320 presents the additional data request from the user.

The third party selector 340 selects the targeted third party, to which the user's request will be sent. The user may have only a single third party to which the request may be sent. However, for requests which may be serviced by one of multiple third parties, for example ordering photos, the third party selector 340 determines where the request should be sent. In one embodiment, a database 345 of third party providers is used by the third party selector 340. The third party selector 340 may choose the targeted third party based on user preferences, financial considerations, special relationships between third party providers and the send-to logic, or other decision factors.

Format logic 350 formats the request for the selected third party provider. In one embodiment, the format logic 350 ensures that both the user's system and the third party provider can be destination-blind. The send-to logic 300 provides the reformatting, which ensures that the third party provider and the stateless device can communicate without being aware of the form-factors and preferences of the other.

State tracking logic 360 assigns state tracking data to the request. This state tracking data enables a round-trip between the third party provider (which generally requires state) and the stateless device (which remains unaware of the previous messages, and does not track states). The state tracking logic 360 adds the state data to messages being sent to the third party provider. Sending logic 370 then sends the formatted request to the third party provider. In one embodiment, the third party provider may respond to the request by sending a response.

Receiving logic 380 receives the response from the third party provider. Directing logic 390 determines where the response should be directed. The response, in one embodiment, may request data from the send-to logic 300. For example, in one embodiment, the send-to logic 300 may maintain a user data repository 305. The user data repository 305, in one embodiment, stores full-size copies of multimedia content for the user. If the third party provider's request is for the full-size copies of multimedia content, the response logic 395 creates the answer in the proper format, to send to the third party provider.

The directing logic 390 may determine that the stateless device should receive the response. The state tracking logic 360, in one embodiment, adds relevant information to the response by the third party provider that are needed by the stateless device. Since the stateless device is unaware of the previous exchange of data between the device and the third party provider, the state tracking logic 360 adds the background information needed by the stateless device to properly answer to the response. In one embodiment, format logic 350 reformats the response for the stateless device.

If the stateless device sends an answer to the third party provider, it is received by the send-to logic 300. In one embodiment, the construction of the answer is done using the composer logic 320. In another embodiment, the answer may be constructed without using the composer logic 320. The syntactic checker 330 verifies the format, and formatting logic may change the format, as appropriate. The state tracking logic 360 attaches appropriate state data to the message, once it is properly formatted. By iterating this process, the stateless device and third party provider can exchange data and complete a multi-step process.

FIGS. 4A-4C are embodiments of data flow diagrams illustrating exemplary data flow in the present system. FIG. 4A illustrates a data flow diagram in which the primary data is supplied by the central server 120, and in which the user initiates the request.

The four components which communicate include the user experience/interaction 405, which indicates those aspects of the stateless device's communication which require positive user action. User device 110 is the stateless device, which may perform various actions in response to commands from the user, or data received from the central server 120 or third party server 125.

The user initiates a request 405. As noted above, the user may initiate a request by selecting an item from an address book, which the user device 110 received from the central server 120. In one embodiment, upon the user's request, the user device 110 displays a message composer.

The request 410 is then forwarded to the central server 120.

The central server identifies the third party provider to which the request should be forwarded. In one embodiment, the central server 120 may perform syntactic checking on the request, to ensure that the format of the request is proper, and all required information is present.

The central server 120 then forwards the request 415 to third party server 125. The third party server 125 processes the request, and responds 420. The response may be a request for additional data, a trigger to start a process on the stateless device, or any other information.

The central server 120 adds state for the user device. In one embodiment, if the user device is expected to respond to the third party server, the state information also includes a next-state, included by the user device with any response returned.

The response 425, including the state information, is then forwarded to the user device 410. The response, in one embodiment, triggers a sub-UI element in the user device. The sub-UI element is an application or feature of an application. For example, the sub-UI element that is triggered may be the photo selection tool, which enables the user to select one or more multimedia elements in their album. Other sub-UI elements may include dialog boxes, applications, and any other user interface elements which may be triggered by the response 425.

The trigger 430, i.e. the sub-UI element which was triggered by the response 425, is experienced by the user. The user then interacts with the sub-UI element, which provides data 435 to the user device. The user interaction may include selecting one of a number of options presented, as in a dialog box, responding to a query, identifying responsive data, etc.

The user device 110 forwards the data 440 to central server 120. Central server 120 adds state data, and reformats for third party server 125 if necessary, and then forwards the data 445.

This cycle of response 420/425 and data 440/445 may be repeated numerous times. At various times, the user device may request data from the third party server. The third party server may also request data 450 from central server 120. In one embodiment, central server 120 may include a data repository for the user. The user may indicate which data to provide to third party provider, and central server 120 may provide data 455 to third party server 125. Each of these steps may be repeated in any order. In one embodiment, the system may repeat these steps in any order. In one embodiment, the central server adds state information to requests/information/data being sent to the user device from the third party server, while it reformats data received from the service-provider-unaware user device for the third party server's consumption.

FIG. 4B illustrates a situation in which the interchange is initiated by the user device. This may occur, for example, if the user has set up a regular schedule, for example to download images from a camera phone.

As can be seen, the exchange is similar that to that illustrated in FIG. 4A otherwise. However, the data is obtained from the user device instead of the central server. Therefore, FIG. 4B illustrates a situation in which the system loops back to send additional replies and additional answers.

FIG. 4C illustrates a situation in which the user's device provides an answer to a request from the third party provider, without requiring user interaction. This may be the case, for example, if the third party provider requests additional image data, or the like. For example, the original request may send a thumbnail image only. The third party provider may then request the full-size image. The handset may respond, without alerting the user, or requiring positive user interaction.

Of course, all of these modes of interaction may take place in the same transaction. That is, a single transaction may include one or more of: messages handled by the central server, messages handled by the stateless device, and messages which trigger user interface elements and request user actions. The above described processes are merely exemplary, however, and one of skill in the art would understand the logical extensions of these data flows.

Figure 5:
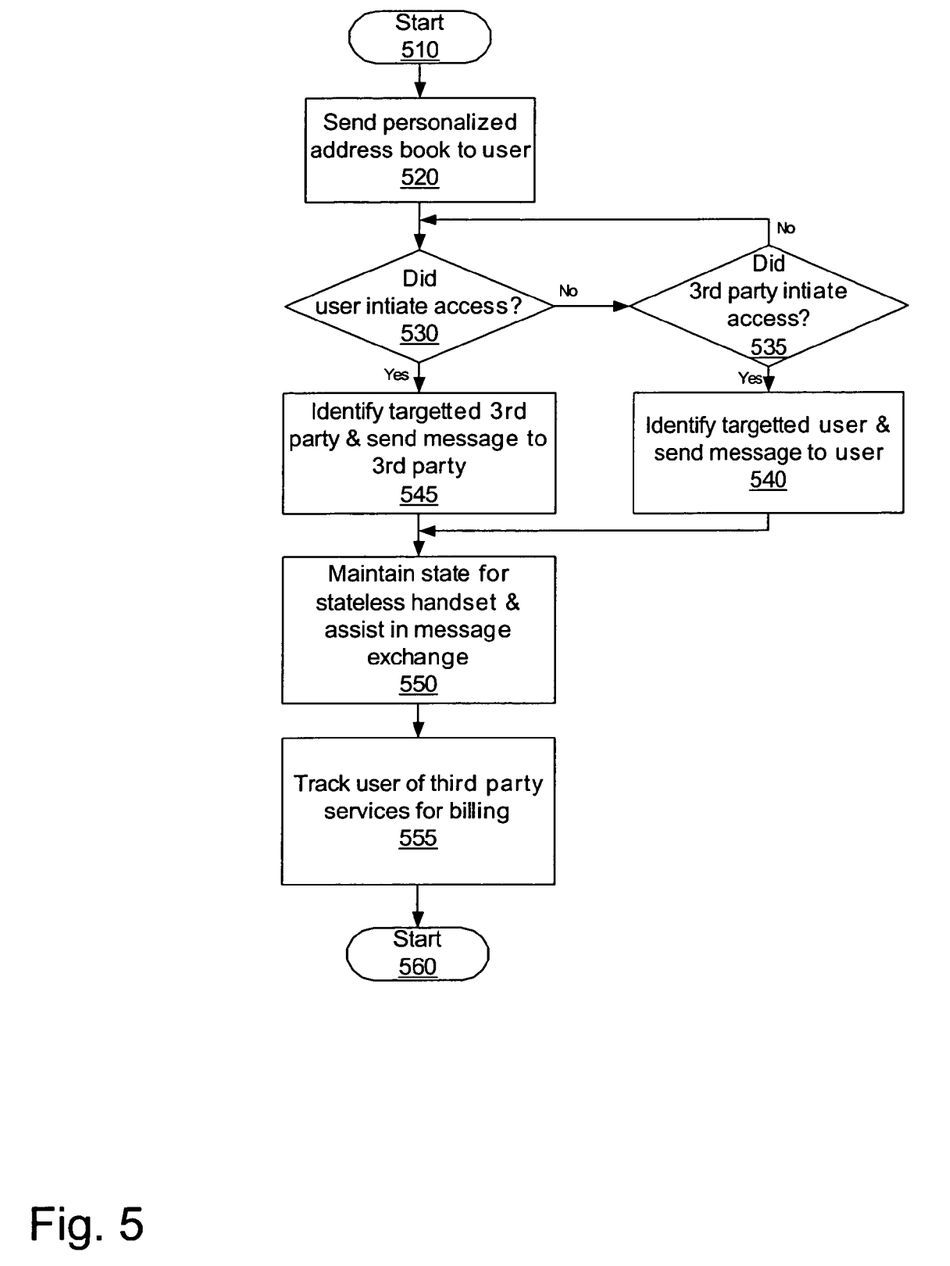
FIG. 5 is an overview flowchart of one embodiment of the send-to framework.

FIG. 5 is an overview flowchart of one embodiment of the send-to framework. The process starts at block 510. At block 520, the system sends a personalized address book to the user. The personalized address book includes the third party providers that the user can access. In one embodiment, the personalized address book is integrated into the user's standard address book.

At block 530, the process determines whether the user initiated access. The user initiates access by selecting an item from the personalized toolbar. If the user initiated access, the process continues to block 545.

At block 545, the targeted third party is identified, and the request is sent to the third party. This is described in more detail below. In one embodiment, the identification of the third party is performed by the central server. The process then continues to block 550.

If the user did not initiate access at block 530, the process continues to block 535. At block 535, the process determines whether the third party initiated access. If the third party did not initiate access, the process returns to block 530, to await initiation from either the user or the third party.

If the third party initiated access, at block 535, the process continues to block 540, and the targeted user is identified. A message is then sent to the user. In one embodiment, the message is sent via the central server. The process then continues to block 550.

At block 550, the central server maintains a state for the stateless handset, and assists in the message exchange between the user, the third party, and, if appropriate, the media repository. At block 555, the central server tracks the third party services for the user, for billing purposes. In one embodiment, the central server tracks connection time for the cellular provider. In one embodiment, the central server provides billing services to the third party. The process then ends, at block 560.

Figure 6:
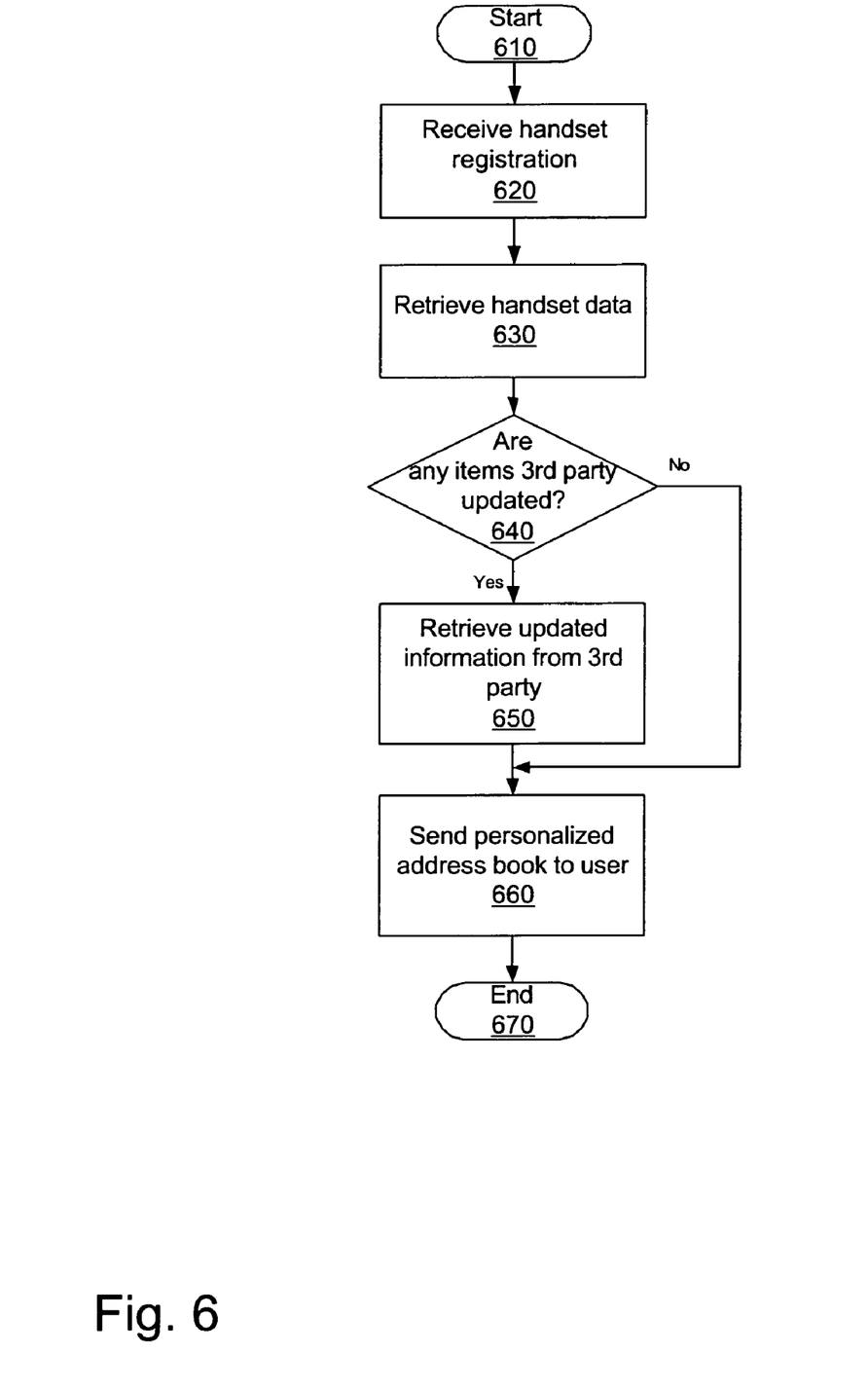
FIG. 6 is a flowchart of one embodiment of sending a personalized address book to a user.

FIG. 6 is a flowchart of one embodiment of sending a personalized address book to a user. The process starts at block 610. At block 620, the handset registration is received. In one embodiment, when a handset is turned on, it registers with its provider.

At block 630, the handset data is retrieved by the central server. The handset data includes a list of third party providers that the user can access. In one embodiment, the personalized address book includes a list of third party providers to which the user has subscribed. For example, if the user has an account on an online photo finishing site, he or she may add that to their personal toolbar. In one embodiment, the user may subscribe to various services, which are represented by entries in the personalized toolbar.

At block 640, the process determines whether there are any items in the toolbar listing that are updated by the third party. In one embodiment, the personalized toolbar may be controlled by the third party provider. For example, one entry in the personalized toolbar may be a "current poll." The personalized toolbar may enable the user to easily vote in a poll, such as the American Idol television show poll. The toolbar entry may be "Vote for A, B, or C?" If there are third party updated items, the process, at block 650 retrieves the information from the third party and updates the toolbar. The process then, at block 660, sends the personalized address book to the user. The process ends at block 670.

In one embodiment the personalized toolbar may be updated at any time. In one embodiment, the central server may push an updated personalized toolbar to the user, at any time.

Figure 7:
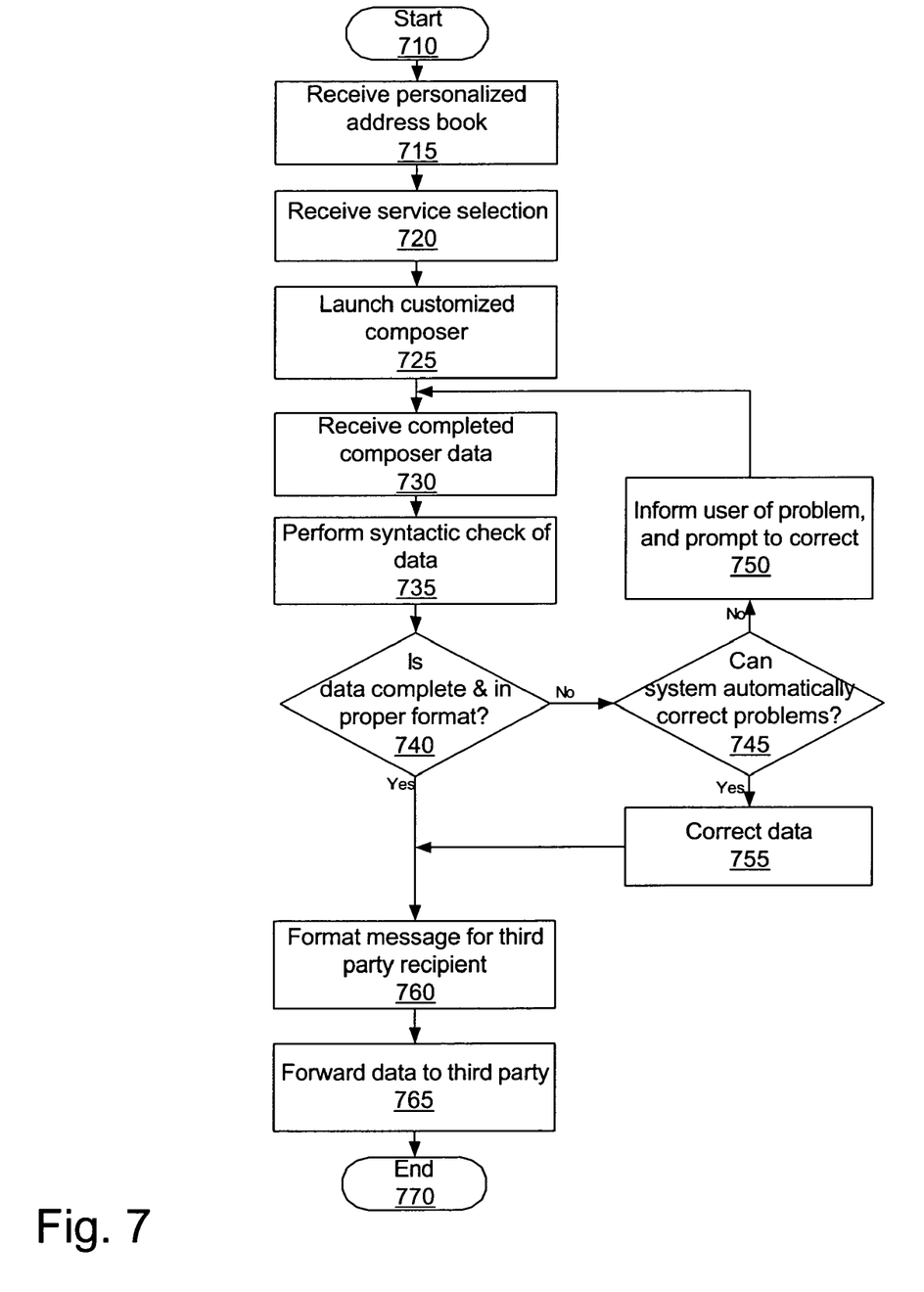
FIG. 7 is a flowchart of one embodiment of initiating an exchange, from the perspective of the stateless device.

FIG. 7 is a flowchart of one embodiment of initiating an exchange, from the perspective of the stateless device. The process starts at block 710. At block 715, the user's device receives the personalized address book for the user.

At block 720, a service selection is received. The user selects one of the items in the personalized address book to initiate the service, in one embodiment. In another embodiment, there may be other applications that may initiate service selection. For example, the user may be in a camera application, and select a "forward" or equivalent function to initiate service.

At block 725, the customized composer is launched, in one embodiment. The customized composer provides a system that prompts the user, and enables the user to fill in the appropriate data. Furthermore, the customized composer, in one embodiment, enables the user to interactively add data to the selection. In one embodiment, the customized composer interacts with the server, while the user is adding data. For example, for constructing a slide show, the system may At block 730, the system receives the completed composer data. At block 735, the system performs a syntactic check on the data. The syntactic check ensures that the data is in the correct format, and that all necessary data is included. In one embodiment, the syntactic check performs a check any time composer data is sent to the server. That is, the system does not wait until the composer data is completed to perform syntactic checks.

At block 740, the process determines whether the data is complete and in a proper format. If so, the process continues to block 760. Otherwise, the process continues to bock 745.

At block 745, the process determines whether the system can automatically correct any issues with the data. In one embodiment, format changes may be automatically made by the system. For example, if the user failed to indicate an area code for the recipient, but the end recipient but the user's address lists has the recipient's information, the system can automatically add this information. If automatic processing is sufficient, at block 755, the data is corrected, and the process continues to block 760. Otherwise, at block 750, the user is notified of the problem, and the process returns to block 730, to enable the user to make alterations to the composer data.

At block 760, the message is formatted for the third party recipient, designated by the service selection. In one embodiment, the system may substitute a higher resolution copy of the image from its repository. Other alterations, such as selecting data type, etc. may also be performed.

At block 765, the message is forwarded to the third party. The process then ends at block 770. In one embodiment, the process does not end completely. Rather, the process continues, as shown in FIG. 8, from the perspective of the central server.

Figure 8:
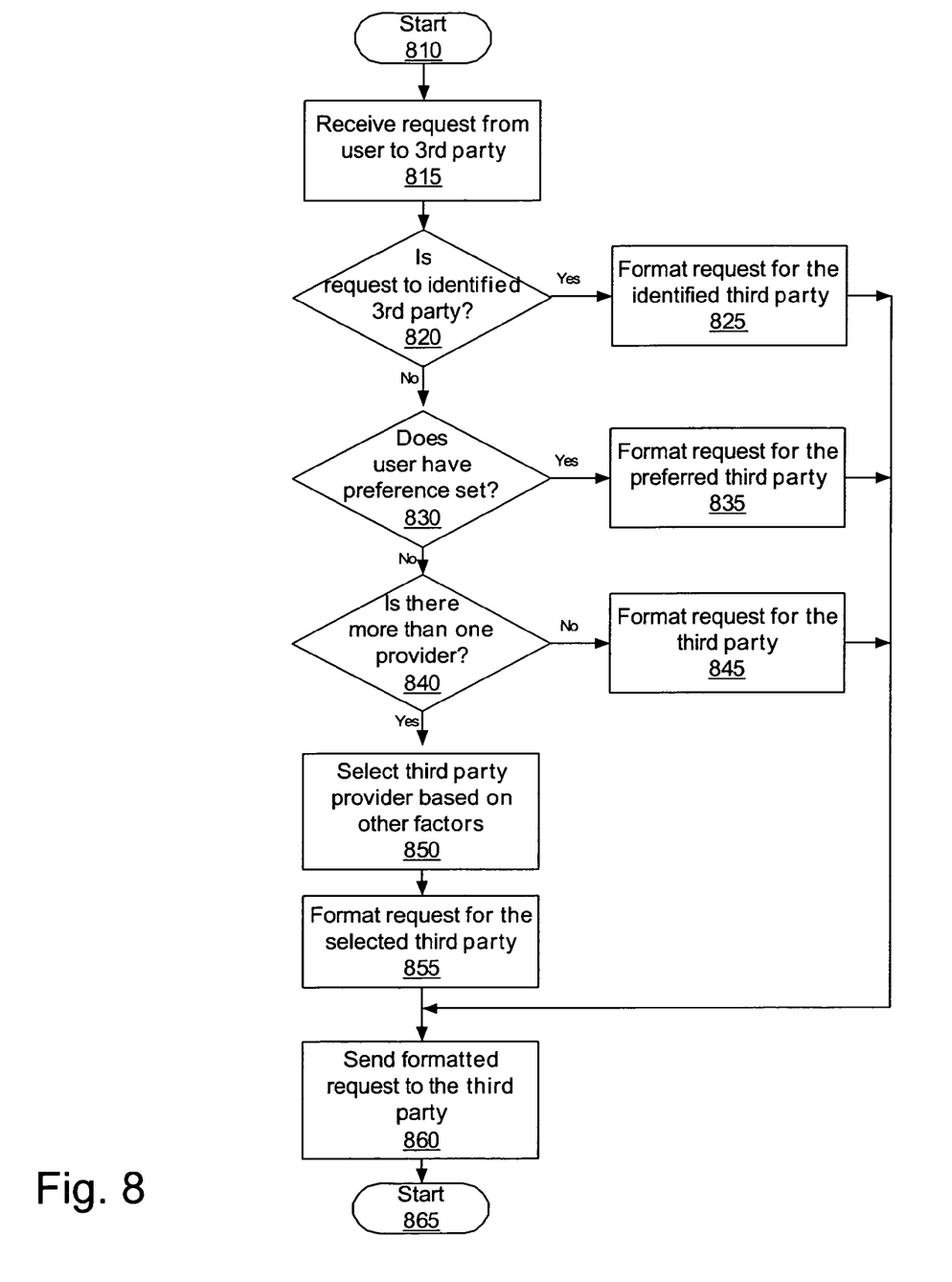
FIG. 8 is a flowchart of one embodiment of forwarding a request from a user to a third party, from the perspective of the central server.

FIG. 8 is a flowchart of one embodiment of forwarding a request from a user to a third party, from the perspective of the central server. At block 815, a request is received from the user to the third party. In one embodiment, the user initiates the process. In another embodiment, the third party may initiate the process. For example a third party may perform processing of some sort, and then initiate a transaction for payment or further processing, after the original transaction has expired.

At block 820, the process determines whether the request is to an identified third party. The user may select an identified third party in the address book. For example, the user may select "my personal blog" which is associated with a particular web site, i.e. third party. If the request is directed to an identified third party, at block 825, the request is formatted for that third party, the process continues to block 860. At block 860, the formatted request is sent to the third party.

If, at block 820, the request was not to an identified third party, the process continues to block 830. At block 830, the process determines whether the user has a preference set. For example, the user may select "make prints of this photo." The user may have accounts at multiple photo processors, i.e. third parties. However, the user may have a preference set, for a default third party. If so, at block 835, the request is formatted for the preferred third party, and the process continues to block 860, to send the formatted request to the third party.

If there is no preferred third party, the process continues to block 840. At block 840, the process determines whether there is more than one provider available for the selected operation. At least one provider is available, if the customized toolbar includes the option. For example, the user must have at least one blogging account, in order for the "send this to my blog" to appear on his or her personalized address book. However, the user may have more than one blog. If there is only one blog, the process, at block 845 formats the request for the sole provider available. The process then continues to block 860, and sends the formatted request to the third party.

If there is more than one provider available, at block 840, the process continues to block 850. At block 850, the third party provider is selected. This selection may be made based on a variety of factors. In one embodiment, the provider may establish a "preferred party" relationship with the third party. In one embodiment, the choice may be made based on the expected charges, i.e. the cheapest provider will be selected for pay services. In another embodiment, the central server's maintainer may be paid for selected providers. In another embodiment, the user may be permitted to select the provider. In another embodiment, other factors may be used for making the selection.

At block 855, the request is formatted for the selected third party. The process then continues to block 860, and the formatted request is sent to the third party.

Figure 9:
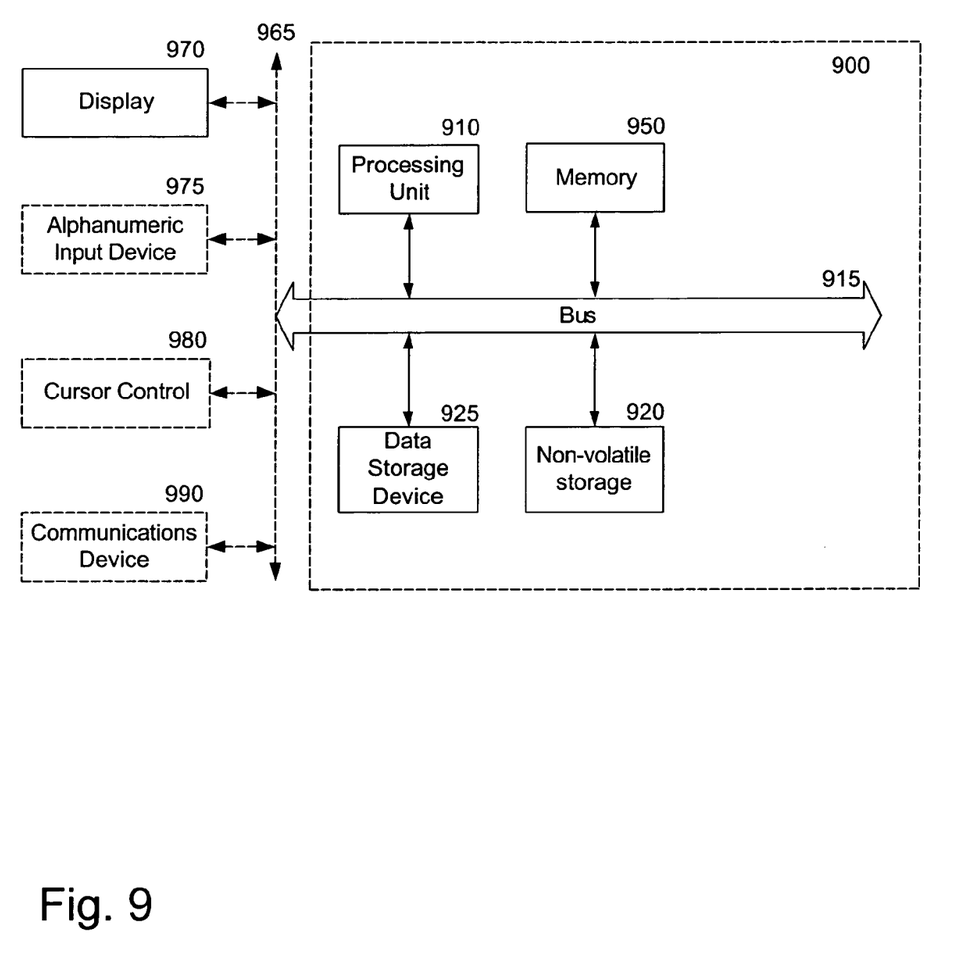
FIG. 9 is a block diagram of one embodiment of a computer system.

FIG. 9 is one embodiment of a computer system that may be used with the present invention. It will be apparent to those of ordinary skill in the art, however that other alternative systems of various system architectures may also be used.

The data processing system illustrated in FIG. 9 includes a bus or other internal communication means 915 for communicating information, and a processor 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a cathode ray tube (CRT) or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 910. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system comprising:
a send-to framework to enable a round-trip mechanism between a stateless device and a third party service provider, by maintaining state data in a server, associated with messages sent to and from the stateless device,
adding, by the server, the state data to the messages sent to and from the stateless device, wherein the state data comprises an identifier assigned to a message to track message exchanges between the stateless device and the third party service provider,
forwarding, by the server, the messages sent from the stateless device, including the state data, to the third party service provider,
receiving, by the server, a response from the third party service provider,
determining, by the server, whether to direct the response to the stateless device, forwarding, by the server, the response sent from the third party service provider, including the state data, to the stateless device based on a determination to direct the response to the stateless device,
wherein the state data includes background information associated with at least one of: a previous message sent to the stateless device and a previous message sent from the stateless device, and
maintaining, by the server, the state data such that when a message is received from the stateless device, the server forwards the message to the third party service provider including proper state data.

2. The system of claim 1, further comprising:
a personal address book provider to enable a user to select a service from the personal address book, the service provided by the third party service provider.

3. The system of claim 2, wherein the service does not identify the third party service provider with specificity.

4. The system of claim 2, wherein the third party provider can push content into the user's personalized address book.

5. The system of claim 2, further comprising:
a composer launched upon selection of the service, the composer to enable the user to construct a request for the third party.

6. The system of claim 5, wherein the composer is run from a server.

7. The system of claim 1, further comprising:
a syntactic checker to ensure that the message to the third party is complete.

8. The system of claim 1, further comprising:
a third party selector to select a destination third party.

9. The system of claim 1, further comprising:
a format logic to format the message for the third party.

10. The system of claim 1, further comprising:
a data serving system to provide data to the third party in reply to the response.

11. A method of providing state data to communicate between a stateless device and a third party service provider, the method comprising
- forwarding, by a server, a request from the stateless device to the third party service provider, wherein the request includes state data added by the server, the state data comprising an identifier assigned to the request to track message exchanges between the stateless device and the third party service provider;
- receiving, by the server, a response from the third party service provider;
- determining, by the server, whether to direct the response to the stateless device,
- adding state data, by the server, to the response based on a determination to direct the response to the stateless device, wherein the state data includes background information associated with the request from the stateless device forwarded to the third party service provider;
- forwarding, by the server, the response from the third party service provider, including the state data, to the stateless device, the state data utilized by the stateless device to associate the response with the request, and
- maintaining, by the server, the state data such that when a message is received from the stateless device, the server forwards the message to the third party service provider including proper state data.

12. The method of claim 11, further comprising:
providing a personal address book including a listing of at least one service provided by a third party provider to the user, enabling the user to select a service from the personal address book.

13. The method of claim 11, further comprising:
receiving a follow-on message from the stateless device, in response to the response;
adding state data to the follow-on message; and
forwarding the follow-on message including the state data to the third party service provider.

14. A central server to enable communication between a stateless device and a state full third party, the central server comprising;
- a processor;
- a state tracking logic to assign an identifier to a message sent from the stateless device to the third party service provider to track message exchanges between the stateless device and the third party, to maintain state data associated with messages sent to and from the stateless device, wherein the state data includes background information associated with at least one of: a previous message sent to the stateless device and a previous message sent from the stateless device;
- a format logic to add the state data to messages sent to and from the stateless device;
- a receiving logic to receive a response from the third party service provider; and
- a directing logic to determine whether the response should be directed to the stateless device and to forward the response to the stateless device.

15. The central server of claim 14, further comprising:
an address book constructor to create personal address book for a user, the personal address book enabling the user to select a service provided by the third party service provider.

16. The central server of claim 15, further comprising:
a third party database to list a plurality of third party service providers able to fulfill a service requested from the user; and
a third party selector to select a third party to fulfill the service request from the user.

\* \* \* \* \*